(12) United States Patent
Huang et al.

(10) Patent No.: US 12,175,175 B2
(45) Date of Patent: Dec. 24, 2024

(54) SYSTEMS AND METHODS FOR GENERATING SYNTHESIZABLE NETLISTS FROM REGISTER TRANSFER LEVEL DESIGNS

(71) Applicant: Taiwan Semiconductor Manufacturing Company Limited, Hsinchu (TW)

(72) Inventors: Boh-Yi Huang, San Jose, CA (US); Chao-Chun Lo, San Jose, CA (US); Chih-yuan Stephen Yu, San Jose, CA (US); Tze-Chiang Huang, Saratoga, CA (US); Chen-jih Lui, Union City, CA (US)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 87 days.

(21) Appl. No.: 16/925,500

(22) Filed: Jul. 10, 2020

(65) Prior Publication Data

US 2022/0012392 A1 Jan. 13, 2022

(51) Int. Cl.
*G06F 30/327* (2020.01)
*G06F 8/41* (2018.01)
*G06F 115/02* (2020.01)

(52) U.S. Cl.
CPC ............ *G06F 30/327* (2020.01); *G06F 8/41* (2013.01); *G06F 2115/02* (2020.01)

(58) Field of Classification Search
CPC ...... G06F 2115/02; G06F 30/327; G06F 8/41; G06F 2119/18; Y02P 90/02; G11C 8/08; G11C 7/12

See application file for complete search history.

(56) References Cited

U.S. PATENT DOCUMENTS 5,210,701 A * 5/1993 Hana ..................... G06F 30/39
716/114
5,742,540 A * 4/1998 Wakasugi .............. G11C 17/12
257/E27.102

(Continued)

*Primary Examiner* — Jack Chiang
*Assistant Examiner* — Aric Lin
(74) *Attorney, Agent, or Firm* — Jones Day

(57) ABSTRACT

Methods, systems, and computer program products are described for generating synthesizable netlists from register transfer level (RTL) designs to aid with semiconductor device design. These netlists provide RTL design information corresponding to a portion of a semiconductor device. A configuration tracer generates behavior information associated with the RTL design. A register compiler compiles a set of semiconductor devices based on one or more technologies and power, performance, and area (PPA) information related to the semiconductor device. Semiconductor devices generated by the register compiler that meet predefined power, performance, and area conditions are identified. Structural information for aligning the input/output ports of the semiconductor device is generated. A set of one or more synthesizable semiconductor device configurations is created based on user defined parameters such that one of the synthesizable semiconductor device designs may by selected to generate a design netlist with structure-synthesizable input/output boundary compatible semiconductor device modules.

20 Claims, 9 Drawing Sheets

(56) References Cited

U.S. PATENT DOCUMENTS

| | | | | |
|---|---|---|---|---|
| 6,135,647 | A * | 10/2000 | Balakrishnan | G06F 30/30 |
| | | | | 716/102 |
| 6,292,427 | B1 * | 9/2001 | Roy | G11C 5/025 |
| | | | | 365/205 |
| 10,437,946 | B1 * | 10/2019 | Kasat | G06F 30/20 |
| 2011/0145777 | A1 * | 6/2011 | Iyer | G06F 3/0629 |
| | | | | 716/132 |
| 2012/0209888 | A1 * | 8/2012 | Chung | G06F 30/30 |
| | | | | 707/802 |
| 2016/0246910 | A1 * | 8/2016 | Subramaniam | G06F 30/327 |
| 2016/0292313 | A1 * | 10/2016 | Subramaniam | G06F 30/398 |
| 2017/0161420 | A1 * | 6/2017 | Hou | H01L 23/49838 |
| 2018/0253346 | A1 * | 9/2018 | Tang | G06F 11/079 |

* cited by examiner

SYSTEMS AND METHODS FOR GENERATING SYNTHESIZABLE NETLISTS FROM REGISTER TRANSFER LEVEL DESIGNS

TECHNICAL FIELD

This relates to semiconductor device design and more particularly to systems and methods for generating synthesizable (e.g., synthesizable performance-power-area (PPA) up-front profile-aware) netlists from register transfer level (RTL) (e.g., behavioral register transfer level) design to aid with semiconductor device (e.g., application specific integrated circuit (ASIC) system on chip (SoC) integrated chip) design.

BACKGROUND

Typically, semiconductor device design involves several steps. Logic associated with digital portions of a semiconductor device may be defined using register transfer level (RTL). RTL design may be implemented using one or more of several tools such as a hardware description language (HDL). The RTL design may be converted into a synthesizable netlist—a detailed description of a hardware circuit which can be used to fabricate a semiconductor device capable of performing the function defined by the RTL design.

BRIEF DESCRIPTION OF THE DRAWINGS

Aspects of the present disclosure are best understood from the following detailed description when read with the accompanying figures.

DETAILED DESCRIPTION

Figure 1:
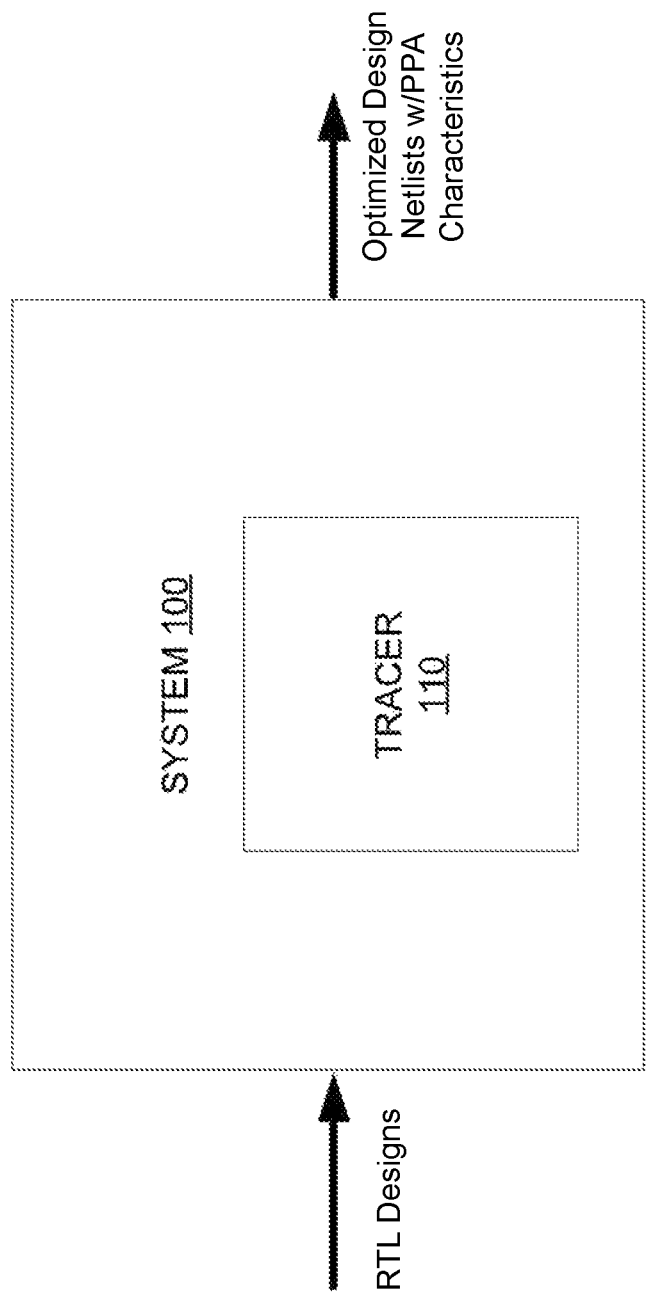
FIG. 1 is a block diagram of an exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

While some portions of the RTL design may include sufficient detail for synthesis, other portions may not. In some instances the RTL design may map to several different synthesizable hardware implementation and in other instances, the RTL design may not include enough information for synthesis. The inability to synthesis from the RTL design may be particularly true in the case of memory (e.g., RAM macro) wrapper design. As a result, it is often necessary to utilize engineering efforts to manually convert the RTL designs (e.g., from ecosystem partners, vendors, customers, or open-sources) to a synthesizable netlist in an incremental and iterative process.

In some instances, the incremental and iterative process may be time consuming. Additionally, since the process is being done manually, the result may not be optimized for performance, power, and area (PPA), including for memory access intensive applications such as machine learning and artificial intelligence.

Semiconductor device (e.g., semiconductor application specific integrated circuit (ASIC) system on chip (SoC) integrated chip) design involves several steps. Logic associated with digital portions of a semiconductor device may be defined using register transfer level (RTL) design techniques. RTL design may be implemented using one or more of several tools such as a hardware description language (HDL). In some embodiments, the RTL design may be referred to as an IP core, or IP design. The RTL design may be converted into a synthesizable netlist—a detailed description of a hardware circuit which can be used to fabricate a semiconductor device capable of performing the function defined by the RTL design. While some portions of the RTL design may include sufficient detail for synthesis, other portions may not. In some instances the RTL design may map to several different synthesizable hardware implementation and in other instances, the RTL design may not include enough information for synthesis. The inability to synthesis from the RTL design may be particularly true in the case of memory (e.g., RAM marco) wrapper design. In RTL design, memory may be defined logically but the physical protocols used to access the memory may not be fully defined. The specific protocols may differ depending on the type of memory. To maintain flexibility with respect to the physical memory type, a wrapper (e.g., a wrapper with flexible inputs/outputs) may be used. In the context of a memory, and semiconductor devices (e.g., semiconductor ASIC SoC integrated chips) more generally, a wrapper defines the interface between logical ports of the memory (e.g., for logical access) and the physical memory ports (e.g., power-control and/or test ports). Since the wrapper is separated from the physical memory itself, it permits the definition of the memory type (e.g., physical characteristics) to be complete interfaces in a chip design process. However, even with the flexibility of the wrapper, it is often necessary to manually convert the RTL to a synthesizable netlist in an incremental and iterative process. This task is typically performed by one or more individuals and may be time consuming.

FIG. 1 is a block diagram of an exemplary system 100 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. System 100 can be a data processing computer system which receives register transfer level (RTL) designs of RAM behavior models that define logic behavior of various circuits. An RTL is a design abstraction which models a synchronous digital circuit in terms of the flow of digital signals between hardware registers, and the logical operations performed on those signals. In some embodiments, the RTL design may be obtained from a single source (e.g., a single design entity) or it may be obtained from multiple sources (e.g., partner designers). In the case of obtaining the RTL design from multiple sources, the format of the RTL design from the different sources may be different. Initially, the RTL design, which includes information related to the behavior of RAM macro models, is automatically processed by an auto-RTL RAM macro configuration tracer to auto generate RAM macro lists (e.g., behavior information and/or size information for the various RAM macro devices). System 100 uses a plurality of modules, as described in more detail in FIGS. 2-3, as well as a tracer 110 to generate an optimized design netlist for a new circuit design. The tracer 110 includes a set of computer programs. Those computer programs can be applied to scan the RTL designs. Corresponding memory sizes such as wordline and/or bitline sizes can be extracted from the scans. The tracer 110 generates output lists with the extracted memory size information. That memory size information can be provided to a register compiler for generating the optimized design netlists. A netlist is a description of the connectivity of an electronic circuit. The netlist is a list that defines various electrical components and node connections between those components. The new circuit design can be an optimized design based on the RTL designs input into system 100. The netlist output by system 100 also includes optimized power, performance, and area (PPA) features. PPA analysis is used to optimize designs as each of the power, performance, and area of a circuit design are integral aspects of the design.

Figure 2:
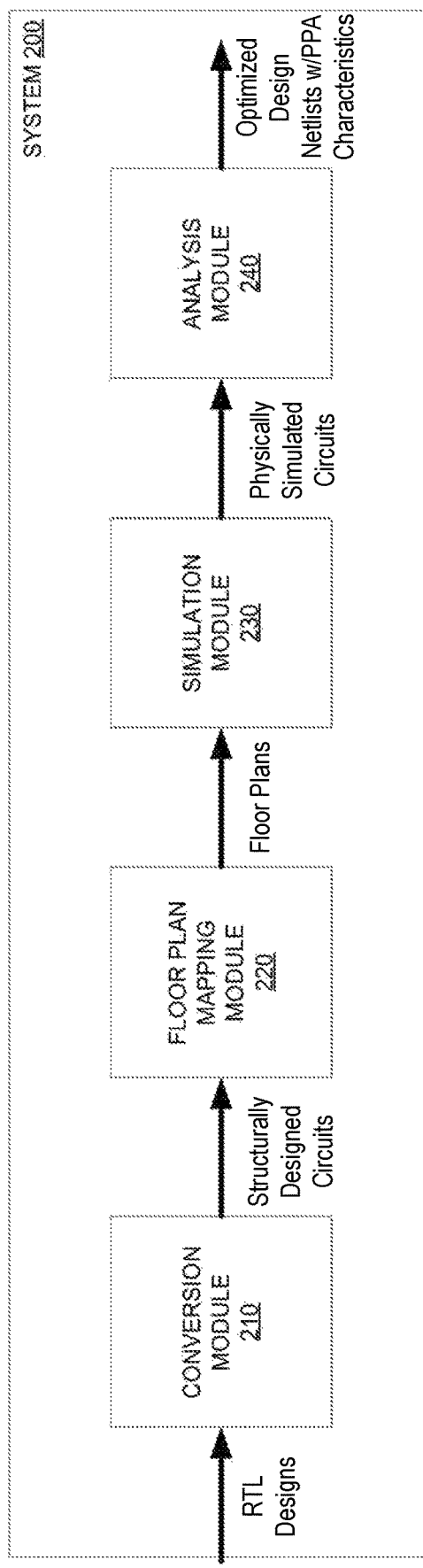
FIG. 2 is a block diagram of another exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

FIG. 2 is a block diagram of another exemplary system 200 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. System 200 includes a conversion module 210, a floor plan mapping module 220, a simulation module 230, and an analysis module 240. The conversion module 210 receives register transfer level code (RTL), as described in FIG. 1. Register transfer level code is software code used within hardware description languages. A physical circuit can be described using register transfer level code that describe digital signal flow between hardware registers and logical operations (e.g., AND, NAND, OR, NOR) performed on the digital signals by components of the physical circuit. The conversion module 210 accesses a register transfer level code description of that circuit logic behavior. The conversion model then converts the register transfer level code into a set of structurally defined circuit designs (e.g., AND gate(s), NAND circuits, OR gate(s), NOR circuits) for multiple types of components (e.g., CPU, GPU, ML-NPU) and feature size technologies (e.g., 5 nm, 7 nm, 10 nm, 12 nm, 16 nm, 28 nm, etc.). The floor plan mapping module 220 accesses the set of structurally defined circuit designs and converts the set of structurally defined circuit designs into a set of floor plans. The floor plans define electrical components within the circuit design and their physical placement in a specific area (e.g., floor). The simulation module 230 accesses the set of floor plans and creates a circuit that can be simulated for each floor plan. The analysis module 240 accesses the physically simulated circuits and sweeps over a range of operating conditions for the physically simulated circuits to generate an optimized design netlist having a set of analyses of a power, performance, and area characteristics for physically simulated circuits. The analysis module 240 also sweeps over a range of operating conditions (e.g., various input voltages, various environmental environments such as high/low temperatures, high/low humidity, and the like) in parallel (e.g., at the same time) for multiple physically simulated circuits simultaneously.

Figure 3:
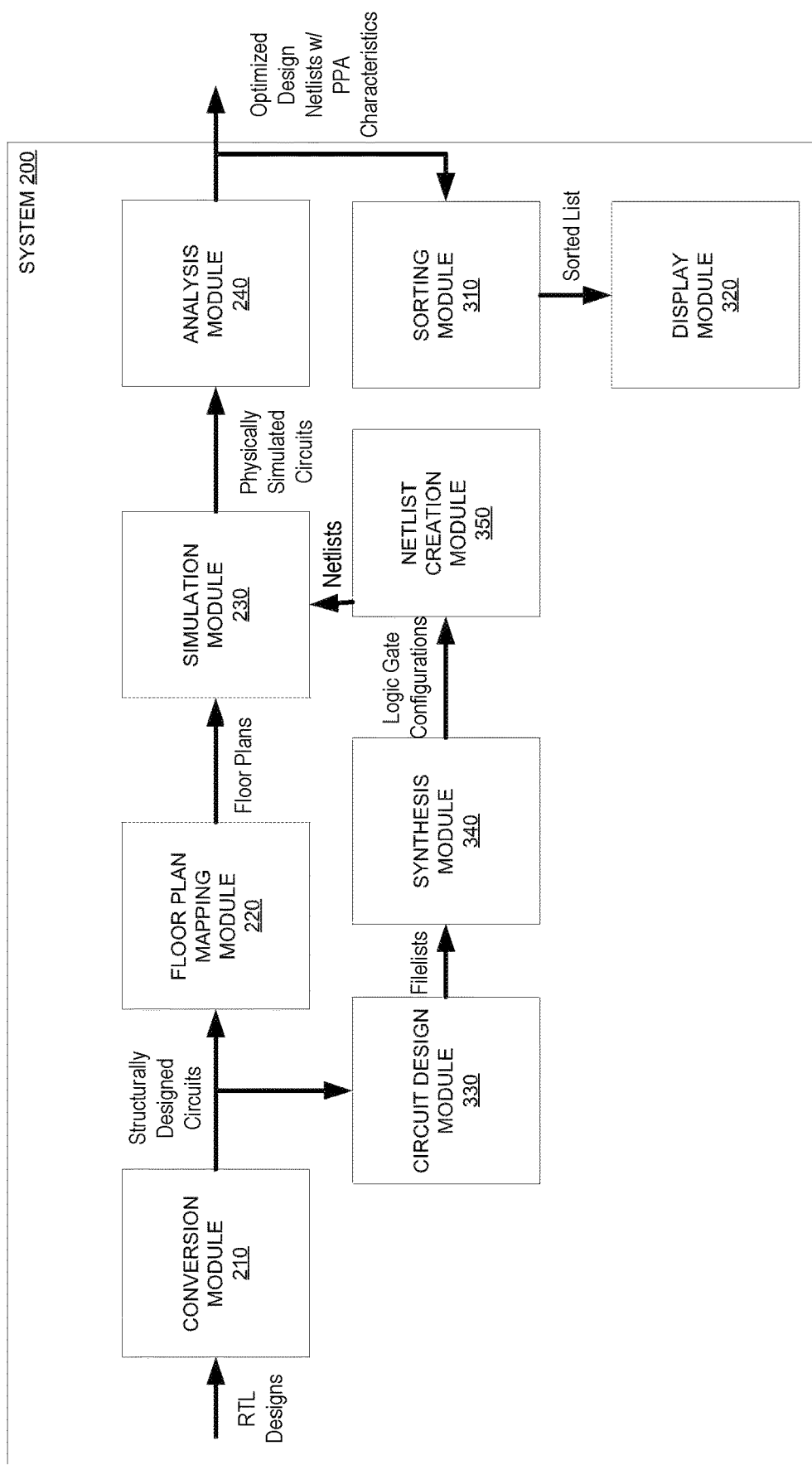
FIG. 3 is a block diagram of another exemplary system for analyzing and extracting data from RAM configurations and register files across various technology sizes (e.g., 5 nm, 7 nm, 10 nm, 12 nm, 16 nm, 28 nm, etc.) in accordance with various embodiments of the present disclosure.

FIG. 3 is a block diagram of another exemplary system 300 for analyzing and extracting data from RAM configurations and register files across various technology sizes (e.g., 5 nm, 7 nm, 10 nm, 12 nm, 16 nm, 28 nm, etc.) in accordance with various embodiments of the present disclosure. Similar to system 200 of FIG. 2, system 300 can include a conversion module 210, a floor plan mapping module 220, a simulation module 230, and an analysis module 240. Additionally, system can include one or more of a sorting module 310, a display module 320, a circuit design module 330, a synthesis module 340, and a netlist creation module 350.

The sorting module 310 accesses the analyses and generates a sorted list of the set of physically simulated circuits by power, performance, and area characteristics that define the power consumption of the circuits, performance namely a frequency that the circuit operates at, and area that the circuit occupies. These characteristics can be sorted based on power, performance, and area values. The display module 320 accesses the sorted list of physically simulated circuits and displays the sorted list of physically simulated circuits on a graphical user interface. The circuit design module 330 accesses the set of structurally defined circuit designs and converts the structurally defined circuit designs into a set of filelists for synthesis of multiple profiled configurations for power, performance, and area characteristics. The filelists define components of the circuits and interconnection points between the components. The synthesis module 340 accesses the set of filelists and synthesizes the set of filelists using a design compiler into a set of logic gate configurations. Synthesis of a circuit includes translating the register transfer level code into a generic Boolean model. That Boolean model can be optimized at the logic level to combine multiple logic operations into more simplistic operations. For example, components can be rearranges, combined, and/or re-combined into different components in an effort to reduce operation time and the number of overall components within the circuit. Additionally, optimization can include sequential mapping of components where logic surrounding a sequential cell can be absorbed within the cell in an effort to save area. The design compiler can also perform various optimization operations such as removing logic having no output port connections, removing redundant components (e.g., such as two sequential inverters), and/or propagating constants to reduce the overall logic components within a circuit. The netlist creation module 350 accesses the set of logic gate configurations and converts the set of logic gate configurations into a set of netlists to be used by simulation module 130. Logic gate configurations contain logic schematics that define component interconnection. These logic gate configurations can be translated into a textual representation of nodes within the configuration, components within the configurations, and their interconnections. This textural representation is a netlist.

Figure 4:
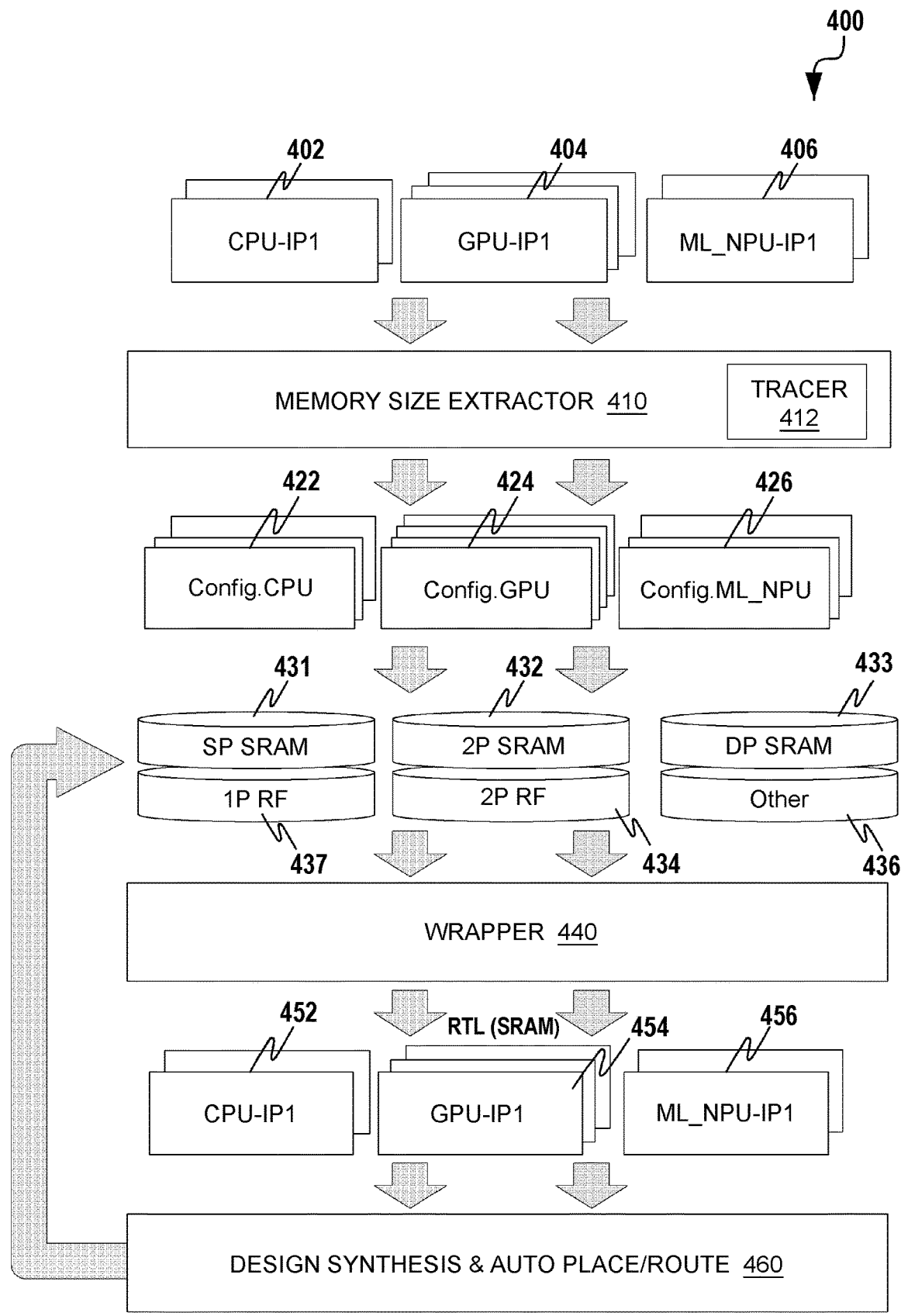
FIG. 4 is an exemplary block diagram illustrating the generation of synthesized netlists in accordance with various embodiments of the present disclosure.

FIG. 4 is an exemplary block diagram 400 illustrating the generation of synthesized netlists in accordance with various embodiments of the present disclosure. Filelists (e.g., RTL designs describing circuit logic behavior—software code which defines logical behavior of a circuit) can relate to any number of technologies such as central processing units (CPU) (e.g., CPU-IP1 402), graphical processing units (GPU) (e.g., GPU-IP1), machine learning network processor (ML-NPU) (e.g., ML-NPU-IP1) and the like. Each set of files lists can include one or more filelists associated with a different module design, as described in more detail in FIGS. 6-7. A memory size extractor 410 (e.g., synthesis module 340) processes a given set of netlists to generate logic gate configurations corresponding to each set which define the size of a given memory cell being evaluated. For example, a logic gate configuration 422 (e.g., config. CPU) corresponds to the CPU-IP1 filelist 402. The memory size extractor 410 also includes a tracer 412. Tracer 412 generates behavior information associated with at least a portion of an RTL design corresponding to a semiconductor device. For example, such behavior information can include device sizing (e.g., number of word lines and number of bit lines). Similarly, a logic gate configuration 422 (e.g., config.GPU) corresponds to the GPU-IP1 filelist 404). The logic gate configuration 426 (e.g., config.ML-NPU) corresponds to the ML-NPU-IP1 filelist 406. The logic gate configurations are compiled as previously described in detail using, for example, a register compiler such as a single-port (SP) static random access memory (SRAM) 431, a two-port SRAM 432, a dual-port (DP) SRAM 433, a 1P RF 432, a 2P RF 434, and any other type of register compiler 436. These compiled configurations are then translated by a wrapper 440 into netlists corresponding to the imported filelist (e.g., filelist 402, filelist 404, filelist 406). A wrapper is software that is defined to encapsulate the code being wrapped such that the code complexity of the code being wrapped is not visible to another interfacing software component. Instead, the wrapper itself contains more simplistic code that creates an interface with that other software component so as to ease the interaction between two software components. Wrappers can be used, for example, when two software components have different types of software code that are not compatible with one another. For example, the netlist CPU-IP1 452 corresponds with filelist CPU-IP1 402. The netlist GPU-IP1 454 corresponds with filelist GPU-IP1 454. The netlist MP-NPU-IP1 456 corresponds with ML-NPU-IP1 406. These netlists are utilized to generate an optimized circuit design using automatic placement of components and/or routing of signals (e.g., step 460). The optimized netlists are transmitted back to the compilers and stored so that they can be utilized in future circuit layouts.

Figure 5:
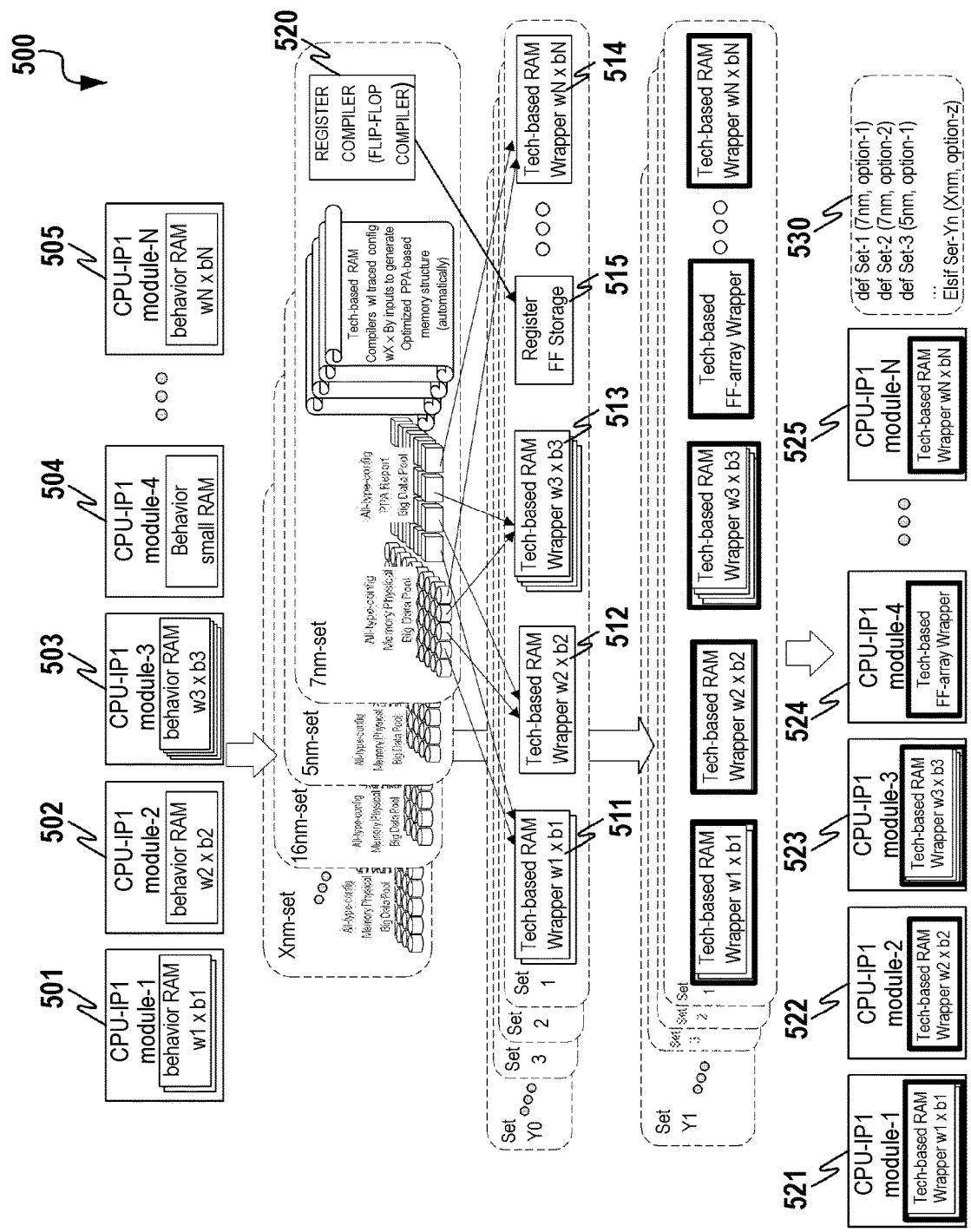
FIG. 5 is an exemplary block diagram illustrating the generation of synthesized CPU netlists in accordance with various embodiments of the present disclosure.

FIG. 5 is an exemplary block diagram 500 illustrating the generation of synthesized CPU netlists in accordance with various embodiments of the present disclosure. In this example, a set of filelists correspond to N number of modules (e.g., filelist 501, filelist 502, filelist 503, filelist 504, filelist 505, etc.). Each filelist includes specific behavior logic associated with that particular module. The set of filelists are compiled together, using register compiler or flip-flop compiler 520, into groupings based on technology sizes (e.g., 5 nm, 7 nm, 16 nm, etc.). Compiling is the process by which a computer program translate written computer code in one program language into another language. Each compilation includes all physical memory configurations as well as PPA configurations associated with the imported filelists 501, 502, 503, 504, 505. In other words, all of the modules having one wordline and one bitline (such as module-1 of filelist 501) across the various technology sizes (e.g., 5 nm, 7 nm, 16 nm, etc.) are compiled together. Similarly, all of the modules having two wordlines and two bitlines (such as module-2 of filelist 502) across the various technology sizes (e.g., 5 nm, 7 nm, 16 nm, etc.) are compiled together. This continues for all modules across all of the various technology sizes (e.g., 5 nm, 7 nm, 16 nm, etc.). A PPA-profiler evaluates the stored compilations (e.g., compilations 511, 512, 513, 514) to logic gate configurations for each technology size (e.g., 5 nm, 7 nm, 16 nm, etc.). The PPA analysis is described in more detail in FIG. 6. The register compiler 520 settings can be stored in register flip-flop storage 515. The compilations 511, 512, 513, 514 along with the register flip-flop storage 515 can be wrapped and compiled to generate corresponding netlists with wrapped PPA profiles (e.g., CPU netlists 521, 522, 523, 524, 525) which define power, performance, and area characteristics for various modules. A wrapper is software that is defined to encapsulate the code being wrapped such that the code complexity of the code being wrapped is not visible to another interfacing software component. Instead, the wrapper itself contains more simplistic code that creates an interface with that other software component so as to ease the interaction between two software components. Wrappers can be used, for example, when two software components have different types of software code that are not compatible with one another. In the instance of the embodiment illustrated in FIG. 5, the PPA profiles define specific power, performance, and area requirements affiliated with the different module sizes (e.g., one wordline/bitline, two wordlines/bitlines, etc.). In some embodiments, a project user defined configurator can set specific sizing definitions for the circuit to be optimized (e.g., user definitions 530). In other words, a user can set specific dimensions for a circuit through user input.

Figure 6:
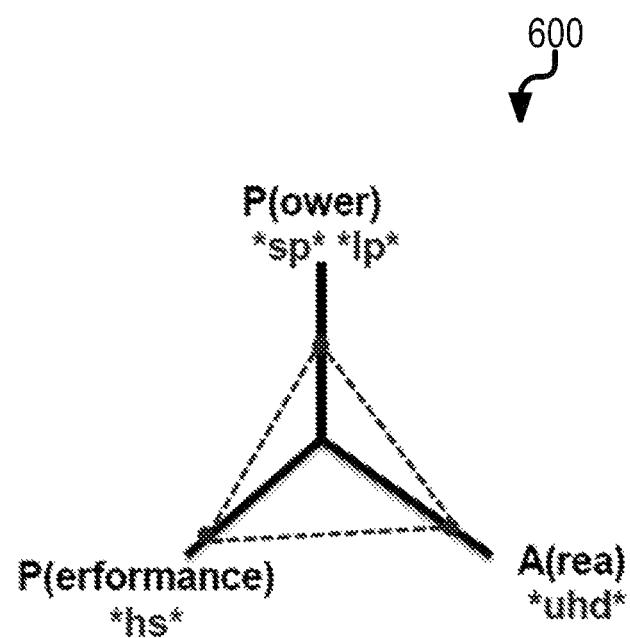
FIG. 6 is an exemplary graphic illustrating a PPA analysis in accordance with various embodiments of the present disclosure.

FIG. 6 is an exemplary graphic 600 illustrating a PPA analysis. Using a PPA profiler, various filelists are evaluated to simultaneously increase performance, maintain low power consumption, and minimize device area. These calculations are performed by triangulating constants associated with power (e.g., sp, Ip), area (e.g., udh), and performance (e.g., hs). These constants define power consumed by an electronic device, an area that the electronic device components occupy, and the clock frequencies (e.g., performance) needed to operate the electronic device. Triangulation is the process of measuring distances between each of the constants (e.g., points illustrated on the graphic 600). The ultimate goal being to have the power constants sp, Ip and the area constant udh be at their lowest possible values while not sacrificing circuit performance hs. All three of these metrics (e.g., power, area, performance) are interdependent such that modifying one of these values impacts the other two.

Figure 7:
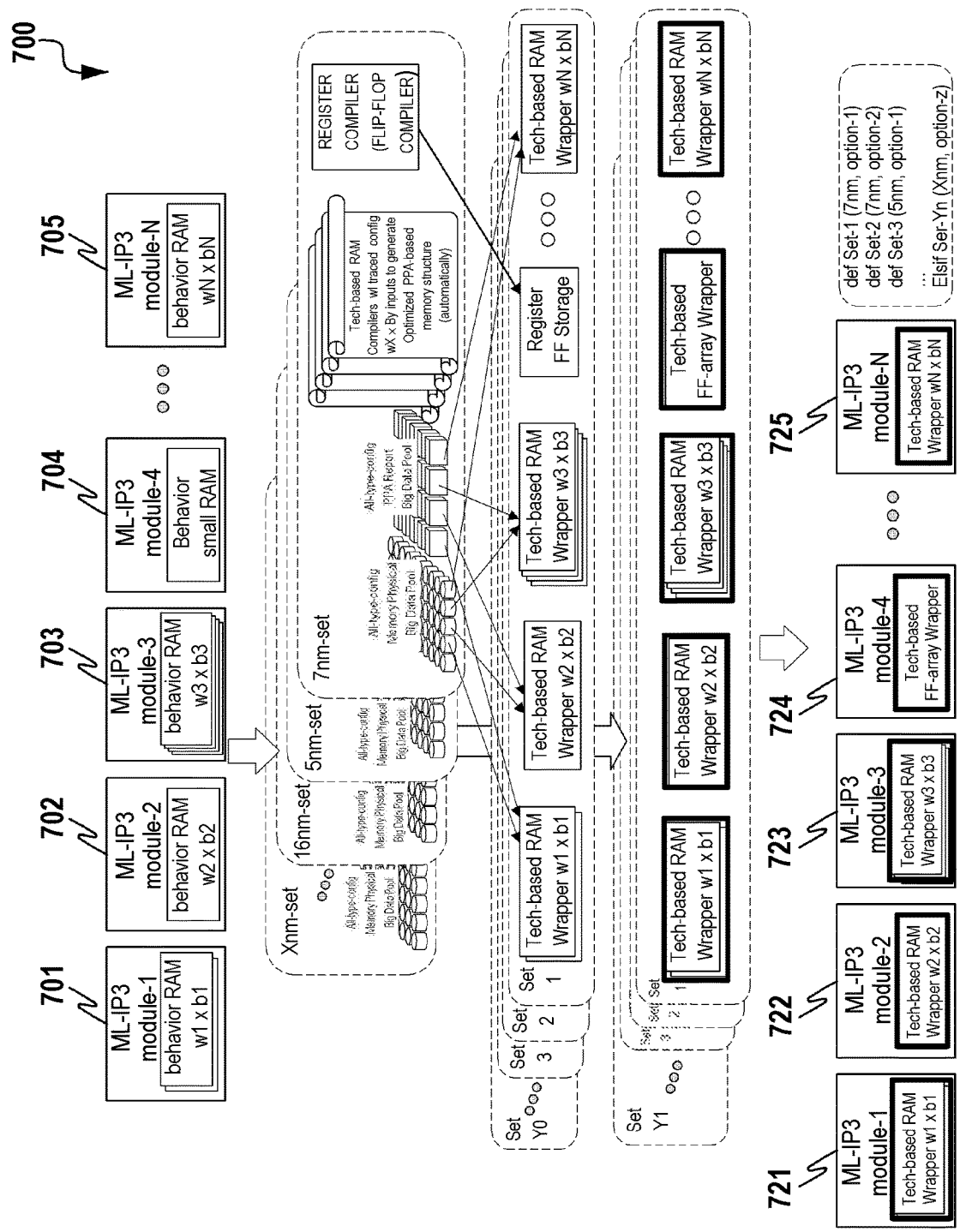
FIG. 7 is an exemplary is an exemplary block diagram illustrating the generation of synthesized ML netlists in accordance with various embodiments of the present disclosure.

FIG. 7 is an exemplary block diagram 700 illustrating the generation of synthesized ML netlists in accordance with various embodiments of the present disclosure. In this example, a set of filelists correspond to N number of modules (e.g., filelist 701, filelist 702, filelist 703, filelist 704, filelist 705, etc.). Each filelist includes specific behavior logic associated with that particular module. Filelist 701 describes a first module (e.g., module-1) having one wordline and one bitline. Filelist 702 describes a second module (e.g., module-2) having two wordlines and two bitlines. Filelist 703 describes a third module (e.g., module-3) having three wordlines and three bitlines. Filelist 704 describes a small RAM having at least four wordline and at least four bitlines. Filelist 705 describes a Nth-module having any number (e.g., N) wordlines and any number (e.g., N) bitlines. As described in detail in FIG. 5, filelists 701, 702, 703, 704, 705 are processed and corresponding netlists with wrapped PPA profiles (e.g., ML netlists 7217, 722, 723, 724, 725) are generated.

Figure 8:
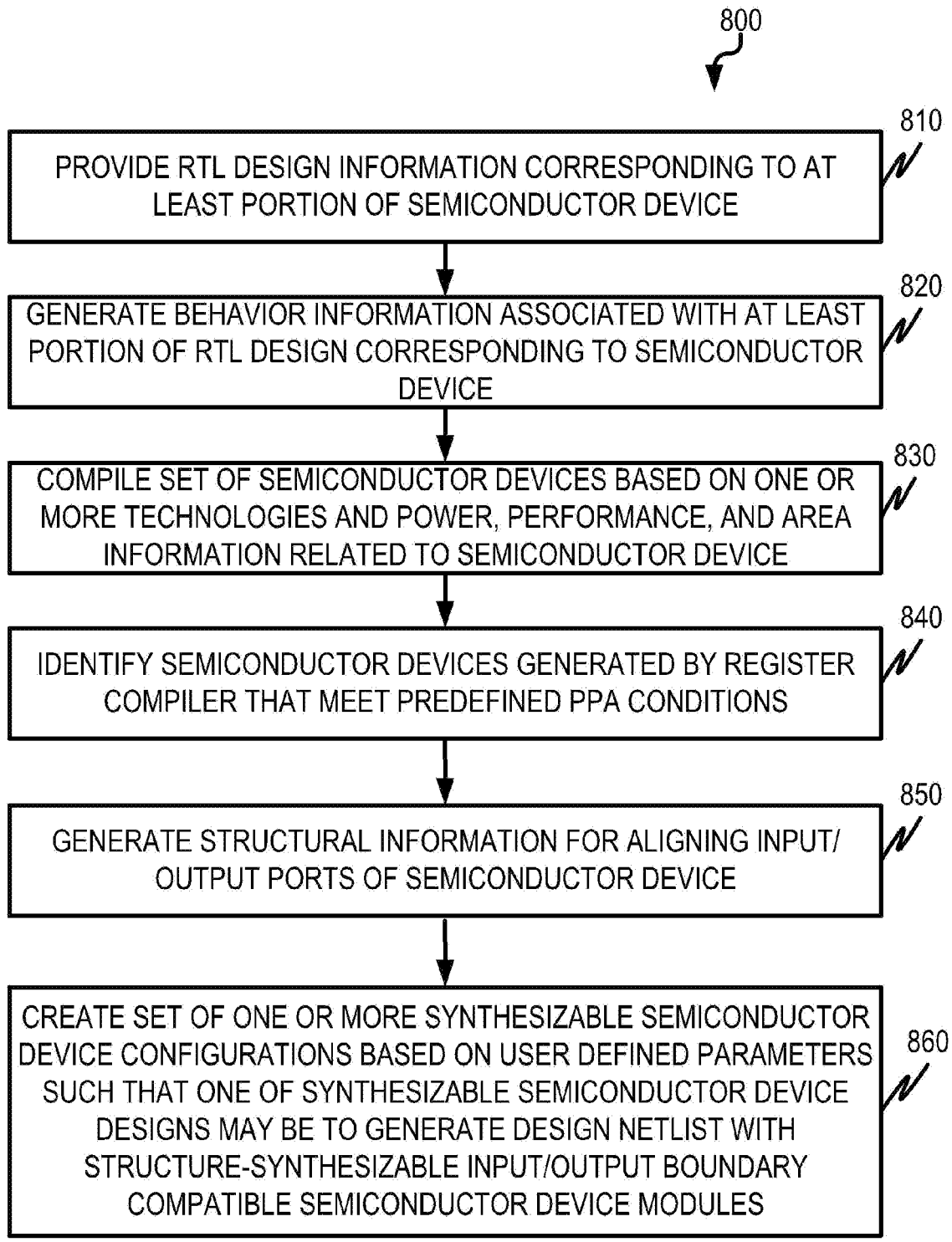
FIG. 8 is an exemplary flow chart illustrating a method for optimizing circuit synthesis for implementation on an integrated circuit in accordance with various embodiments of the present disclosure.

FIG. 8 is an exemplary flow chart 800 illustrating a method for generating synthesizable netlists from RTL designs to aid with semiconductor device designs. While FIG. 8 is described here with reference to previously described structures for ease in understanding, it is understood that the method applies to many other structures as well. RTL design information (e.g., RTL designs of FIG. 1) corresponding to at least a portion of the semiconductor device is provided (e.g., step 810). Behavior information associated with at least a portion of an RTL design corresponding to the semiconductor device is generated (e.g., step 820). A set of semiconductor devices is compiled based on one or more technologies (e.g., CPU-IP 1 402, GPU-IP1 404, ML-NPU-IP1 406) and PPA information related to the semiconductor device (e.g., step 830). Semiconductor devices generated by the register compiler that meet predefined PPA conditions are identified (e.g., step 840). Structural information defining the component layout and interconnections for aligning the input/output ports of the semiconductor device is generated (e.g., step 850). A set of one or more synthesizable semiconductor device configurations is created (e.g., CPU netlists 521, 522, 523, 524, 525, ML netlists 7217, 722, 723, 724, 725) based on user defined parameters such that one of the synthesizable semiconductor device designs may by selected to generate a design netlist with structure-synthesizable input/output boundary compatible semiconductor device modules (e.g., step 860). As discussed previously, synthesis of a circuit includes translating the register transfer level code into a generic Boolean model. That Boolean model can be optimized at the logic level to combine multiple logic operations into more simplistic operations. For example, components can be rearranges, combined, and/or re-combined into different components in an effort to reduce operation time and the number of overall components within the circuit. Additionally, optimization can include sequential mapping of components where logic surrounding a sequential cell can be absorbed within the cell in an effort to save area. The design compiler can also perform various optimization operations such as removing logic having no output port connections, removing redundant components (e.g., such as two sequential inverters), and/or propagating constants to reduce the overall logic components within a circuit.

Figure 9:
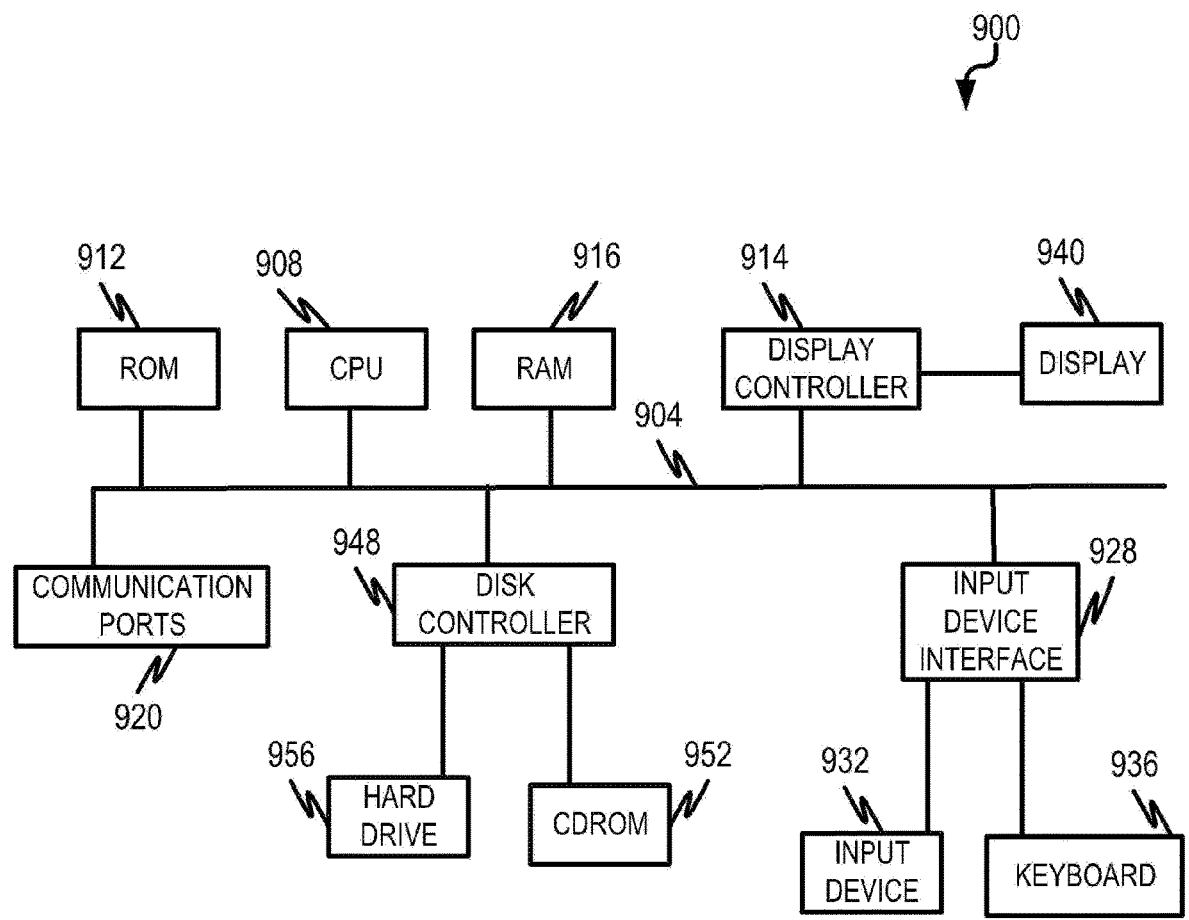
FIG. 9 is an exemplary block diagram illustrating a sample computing device architecture for implementing various aspects described herein.

FIG. 9 is an exemplary block diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal CD-ROM, CD-R, CD-RW or DVD, or solid state drives such as 952, or external or internal hard drives 956. As indicated previously, these various disk drives 952, 956 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard 936 and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone or tactile feedback); and input from the user can be received in any form, including acoustic, speech, or tactile input. In the input device 932 and the keyboard 936 can be coupled to and convey information via the bus 904 by way of an input device interface 928. Other computing devices, such as dedicated servers, can omit one or more of the display 940 and display interface 914, the input device 932, the keyboard 936, and input device interface 928.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Perl, Python, Tcls, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various processes as described herein can provide a number of advantages. For example, use of the subject matter can provide a number of advantages. For example, use of the subject matter can shorten ASIC development schedules as circuit are automatically optimized through design and require minimal to no re-design efforts. The simulations described herein also facilitate device validation without the time delay associated with producing and manually testing a device.

In one embodiment, RTL design information corresponding to at least a portion of the semiconductor device is provided. Behavior information associated with at least a portion of an RTL design corresponding to the semiconductor device is generated. A set of semiconductor devices based on one or more technologies and PPA information related to the semiconductor device are compiled. Semiconductor devices generated by the register compiler that meet predefined PPA conditions are identified. Structural information for aligning the input/output ports of the semiconductor device is generated. A set of one or more synthesizable semiconductor device configurations based on user defined parameters is created such that one of the synthesizable semiconductor device designs may by selected to generate a design netlist with structure-synthesizable input/output boundary compatible semiconductor device modules.

In another embodiment, a system for generating synthesizable netlists from RTL designs to aid with semiconductor device design includes a configuration tracer, a register compiler, and a technology options configuration. The configuration tracer generates size information associated with at least a portion of an RTL design corresponding to the semiconductor device. A register compiler compiles a set of semiconductor devices based on power, performance, and area (PPA) information related to the semiconductor device. A technology options configurator creates a set of one or more synthesizable semiconductor device configurations based on user defined parameters such that one of the synthesizable semiconductor device designs can be selected to generate a design netlist based on the size information and the compiled set of semiconductor devices.

In yet another embodiment, a system for generating synthesizable netlists from RTL designs to aid with semiconductor device design includes an automatic-RTL configuration tracers, a memory register compiler, a PPA-aware profiler, a memory wrapper, and a technology options configurator. The automatic-RTL configuration tracer generates behavior information associated with at least a portion of an RTL design corresponding to one or more memory devices associated with the semiconductor device. A memory register compiler compiles a set of memory devices based on one or more technologies and PPA information related to the memory device. The PPA-aware profiler identifies memory devices generated by the memory register compiler that meet predefined power, performance, and area conditions. A memory wrapper generates structural information for aligning the input/output ports of the memory device. A technology options configurator creates a set of one or more synthesizable memory device configurations based on user defined parameters such that one of the synthesizable memory device designs can by selected to generate a design netlist with structure-synthesizable input/output boundary compatible memory device modules.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for generating synthesizable netlists from register transfer level (RTL) designs to aid with semiconductor device design comprising:
   providing RTL design information corresponding to at least a portion of the semiconductor device without providing sufficient RTL design detail for synthesis;
   generating behavior information associated with at least a portion of an RTL design corresponding to the semiconductor device;
   compiling, by a compiler, a set of semiconductor devices based on one or more technologies and power, performance, and area (PPA) information across a plurality of technology sizes, wherein the compiling generates first and second compilations, each of which includes a plurality of modules, the modules of the first compilation have the same number of wordlines or bitlines across the plurality of technology sizes, the modules of the second compilation have the same number of wordlines or bitlines across the plurality of technology sizes, and the number of wordlines or bitlines of the modules of the first compilation is different from the number of wordlines or bitlines of the modules of the second compilation, respectively;
   storing at least one setting of the compiler in a storage;
   wrapping the first and second compilations and the storage to generate a plurality of netlists, wherein each of the netlists corresponds to a respective one of the first and second compilations;
   identifying semiconductor devices within the compiled semiconductor devices that meet predefined PPA conditions by querying the PPA information across the plurality of technology sizes;
   generating structural information for aligning the input/output ports of the semiconductor device; and after providing the RTL design information, creating a set of one or more synthesizable semiconductor device configurations based on user defined parameters such that one of the synthesizable semiconductor device designs may be selected to generate a design netlist with structure-synthesizable input/output boundary compatible semiconductor device modules.

2. The method of claim 1 further comprising selecting one of a synthesizable semiconductor device designs for synthesis.

3. The method of claim 1, wherein the semiconductor device is at least one memory device, the method further comprising generating size information for the memory device.

4. The method of claim 3, wherein the memory device is a random access memory (RAM MACRO) selected from a group comprising at least one of a single port (SP SRAM), a 2-port (2P) SRAM, a dual-port (DP) SRAM, a single port (1P) register files, and/or a dual-port (2P) register files.

5. The method of claim 3, wherein compiling the set of semiconductor devices is based further on information about the size of the memory device.

6. The method of claim 1, wherein the one or more technologies includes fabrication technology corresponding to any combination of one or more of 3 um, 1.5 um, 1.2 um, 1.0 um, 0.8 um, 0.6 um, 0.5 um, 0.35 um, 0.25 um, 0.18 um, 0.13 um, 90 nm, 65 nm, 40 nm, 28 nm, 22 nm, 20 nm, 16 nm, 12 nm, 10 nm, 7 nm, 6 nm, 5 nm, 3 nm fabrication.

7. The method of claim 1, wherein the compiling comprises using one or more databases of information, including a database of physical memory configurations and/or performance, power, and area information.

8. The method of claim 1, wherein generating the structural information is performed after generating the behavior information.

9. The method of claim 1, wherein generating the structural information is performed after compiling the set of semiconductor devices.

10. The method of claim 1, wherein the compiling groups the semiconductor devices based on the technology sizes.

11. A system for generating synthesizable netlists from register transfer level (RTL) designs to aid with semiconductor device design comprising:
one or more data processors configured to perform operations commanded by instructions stored on a non-transitory computer-readable medium, the instructions comprising:
generating size information associated with at least a portion of an RTL design corresponding to the semiconductor device without providing sufficient RTL design detail for synthesis;
compiling, by a compiler, a set of semiconductor devices based on power, performance, and area (PPA) information across a plurality of technology sizes, wherein the compiling generates first and second compilations, each of which includes a plurality of modules, the modules of the first compilation have the same number of wordlines or bitlines across the plurality of technology sizes, the modules of the second compilation have the same number of wordlines or bitlines across the plurality of technology sizes, and the number of wordlines or bitlines of the modules of the first compilation is different from the number of wordlines or bitlines of the modules of the second compilation, respectively;
storing at least one setting of the compiler in a storage;
wrapping the first and second compilations and the storage to generate a plurality of netlists, wherein each of the netlists corresponds to a respective one of the first and second compilations;
identifying semiconductor devices within the compiled semiconductor devices that meet predefined PPA conditions by querying the PPA information across the plurality of technology sizes; and
creating a set of one or more synthesizable semiconductor device configurations based on user defined parameters such that one of the synthesizable semiconductor device designs can be selected to generate a design netlist based on the generated size information and the compiled semiconductor devices.

12. The system of claim 11, wherein the RTL design is obtained from a plurality of sources.

13. The system of claim 11, wherein the semiconductor device is at least one memory device, the instructions further comprising generating behavior information for the memory device.

14. The system of claim 13, wherein the memory device is a random access memory (RAM MACRO) selected from a group comprising at least one of a single port (SP SRAM), a 2-port (2P) SRAM, a dual-port (DP) SRAM, a single port (1P) register files, and/or a dual-port (2P) register files.

15. The system of claim 13, wherein the instructions compile the set of semiconductor devices based further on information about the size of the memory device.

16. The system of claim 11, wherein the one or more technologies includes fabrication technology corresponding to any combination of one or more of 3 um, 1.5 um, 1.2 um, 1.0 um, 0.8 um, 0.6 um, 0.5 um, 0.35 um, 0.25 um, 0.18 um, 0.13 um, 90 nm, 65 nm, 40 nm, 28 nm, 22 nm, 20 nm, 16 nm, 12 nm, 10 nm, 7 nm, 6 nm, 5 nm, 3 nm fabrication.

17. The system of claim 11, wherein the compiling comprises using one or more databases of information, including a database of physical memory configurations and/or performance, power, and area information.

18. The system of claim 11, wherein the compiling is such that semiconductor devices of the set of semiconductor devices having a same number of wordlines and a same number of bitlines are compiled together.

19. The system of claim 11, wherein the compiling is such that semiconductor devices of the set of semiconductor devices having a number of wordlines the same as a number of bitlines are compiled together.

20. A system for generating synthesizable netlists from register transfer level (RTL) designs to aid with semiconductor device design comprising:
one or more data processors configured to perform operations commanded by instructions stored on a non-transitory computer-readable medium, the instructions comprising:
generating behavior information associated with at least a portion of an RTL design corresponding to one or more memory devices associated with the semiconductor device without providing sufficient RTL design detail for synthesis;
compiling, by compiler, a set of memory devices based on one or more technologies and power, performance, and area (PPA) information across a plurality of technology sizes, wherein the compiling generates first and second compilations, each of which includes a plurality of modules, the modules of the first compilation have the same number of wordlines or bitlines across the plurality of technology sizes, the modules of the second compilation have the same number of wordlines or bitlines across the plurality of technology sizes, and the number of wordlines or bitlines of the modules of the first compilation is different from the number of wordlines or bitlines of the modules of the second compilation, respectively;

storing at least one setting of the compiler in a storage;

wrapping the first and second compilations and the storage to generate a plurality of netlists, wherein each of the netlists corresponds to a respective one of the first and second compilations;

identifying memory devices within the compiled memory devices that meet predefined power, performance, and area conditions by querying the PPA information across the plurality of technology sizes;

generating structural information for aligning the input/output ports of the memory device; and creating a set of one or more synthesizable memory device configurations based on user defined parameters such that one of the synthesizable memory device designs can be selected to generate a design netlist with structure-synthesizable input/output boundary compatible memory device modules.

* * * * *